United States Patent
Zhang et al.

(10) Patent No.: US 8,712,984 B2
(45) Date of Patent: Apr. 29, 2014

(54) BUFFER POOL EXTENSION FOR DATABASE SERVER

(75) Inventors: Chengliang Zhang, Redmond, WA (US); Sadashivan Krishnamurthy, Redmond, WA (US); Georgiy I. Reynya, Redmond, WA (US); Alexandre Verbitski, Woodineille, WA (US); Pedro Celis, Redmond, WA (US); Dexter Paul Bradshaw, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 1035 days.

(21) Appl. No.: 12/717,139

(22) Filed: Mar. 4, 2010

(65) Prior Publication Data

US 2011/0219169 A1    Sep. 8, 2011

(51) Int. Cl.
    *G06F 17/30*    (2006.01)
(52) U.S. Cl.
    USPC .......................................... 707/705; 707/748
(58) Field of Classification Search
    USPC .................................. 707/705, 748
    See application file for complete search history.

(56) References Cited

U.S. PATENT DOCUMENTS

| | | | |
|---|---|---|---|
| 5,680,573 A | 10/1997 | Rubin et al. | |
| 5,897,634 A | 4/1999 | Attaluri et al. | |
| 5,940,823 A * | 8/1999 | Schreiber et al. | 707/741 |
| 6,643,640 B1 * | 11/2003 | Getchius et al. | 707/719 |
| 6,754,662 B1 * | 6/2004 | Li | 707/693 |
| 7,330,933 B2 | 2/2008 | Crick | |
| 7,689,607 B2 * | 3/2010 | Oks et al. | 707/648 |
| 7,962,693 B1 * | 6/2011 | Bumbulis | 711/118 |
| 8,010,747 B2 * | 8/2011 | van Riel | 711/133 |
| 8,145,859 B2 * | 3/2012 | Park et al. | 711/159 |
| 8,161,241 B2 * | 4/2012 | Bhattacharjee et al. | 711/118 |
| 8,250,111 B2 * | 8/2012 | Huras et al. | 707/802 |
| 8,375,178 B2 * | 2/2013 | Rana et al. | 711/154 |
| 8,438,337 B1 | 5/2013 | Garg et al. | |
| 2002/0013887 A1 | 1/2002 | Ting | |
| 2004/0078541 A1 | 4/2004 | Lightstone et al. | |
| 2004/0205297 A1 | 10/2004 | Bearden | |
| 2005/0005080 A1 | 1/2005 | Dunshea et al. | |
| 2005/0262059 A1 | 11/2005 | White | |

(Continued)

FOREIGN PATENT DOCUMENTS

| | | |
|---|---|---|
| CN | 101320353 | 1/2008 |
| CN | 101101563 | 12/2008 |

OTHER PUBLICATIONS

U.S. Appl. No. 13/305,670, filed Nov. 28, 2011, Zhang.
U.S. Appl. No. 61/497,420, filed Jun. 15, 2011, Celis.

(Continued)

*Primary Examiner* — Kim Nguyen
(74) *Attorney, Agent, or Firm* — Henry Gabryjelski; Raghu Chinagudabha; Micky Minhas (57) ABSTRACT

Aspects of the subject matter described herein relate to a buffer pool for a database system. In aspects, secondary memory such as solid state storage is used to extend the buffer pool of a database system. Thresholds such as hot, warm, and cold for classifying pages based on access history of the pages may be determined via a sampling algorithm. When a database system needs to free space in a buffer pool in main memory, a page may be evicted to the buffer pool in secondary memory or other storage based on how the page is classified and conditions of the secondary memory or other storage.

20 Claims, 5 Drawing Sheets

(56) References Cited

U.S. PATENT DOCUMENTS

| | | | |
|---|---|---|---|
| 2007/0083716 | A1 | 4/2007 | Rajamony et al. |
| 2007/0094450 | A1 | 4/2007 | Vander Weil |
| 2008/0059707 | A1 | 3/2008 | Makineni et al. |
| 2008/0147974 | A1 | 6/2008 | Madison et al. |
| 2008/0244370 | A1 | 10/2008 | Lam |
| 2008/0270738 | A1 | 10/2008 | Makphaibulchoke et al. |
| 2009/0024800 | A1 | 1/2009 | Flemming et al. |
| 2009/0055591 | A1 | 2/2009 | Miwa et al. |
| 2009/0177667 | A1 | 7/2009 | Ramos et al. |
| 2009/0210445 | A1 | 8/2009 | Draese et al. |
| 2010/0153649 | A1 | 6/2010 | Li et al. |
| 2011/0066808 | A1 | 3/2011 | Flynn et al. |
| 2011/0219169 | A1* | 9/2011 | Zhang et al. .................. 711/103 |

OTHER PUBLICATIONS

Bishwaranjan Bhattacharjee et al., Enhancing Recovery Using an SSD Buffer Pool Extension—Published Date: Jun. 13, 2011, Proceedings: Seventh International Workshop on Data Management on New Hardware, pp. 10-16 http://www.cse.ust.hk/damon2011/damon2011_proceedings.pdf.

Mustafa Canim et al., SSD Bufferpool Extensions for Database Systems—Published Date: Sep. 2010 Proceedings: Proceedings of the VLDB Endowment, vol. 3, No. 2, pp. 1435-1446 http://citeseerx.ist.psu.edu/viewdoc/download?doi=10.1.1.174.6258&rep=rep1&type=pdf.

Manos Athanassoulis et al., Flash in a DBMS:Where and How?—Published Date: Jan. 2010, Proceedings: IEEE Data Eng. Bull. 33, http://wvvw.cs.cmu.edu/~chensm/papers/flash-DEBull10.pdf.

Jaeyoung Do et al., Turbocharging DBMS Buffer Pool Using SSDs—Published Date: Jun. 12-16, 2011 Proceedings: SIGMOD'11, Proceedings of the 2011 international conference on Management of data, pp. 1113-1124 http://pages.cs.wisc.edu/~jignesh/publ/turboSSD.pdf.

R. F. Freitas, W. W. Wilcke, Storage-class memory: The next storage system technology—Published Date: Jul. 2008 Proceedings: IBM Journal of Research and Development, vol. 52, Issue: 4.5, pp. 439-447 http://ieeexplore.ieee.org/stamp/stamp.jsp?tp=&arnumber=5388608.

Yongkun Wang, Research on High Performance Database Management Systems with Solid State Disks—Published Date: Dec. 2010, http://repository.dl.itc.u-tokyo.ac.jp/dspace/bitstream/2261/43997/1/48077412.pdf.

"International Search Report", Mailed Date: Nov. 17, 2011, Application No. PCT/US2011/026930, Filed Date: Mar. 2, 2011, pp. 8.

Otto, Adrian, "Memcached: More Cache=Less Cash!", Retrieved at <<http://www.rackspacecloud.com/blog/2009/07/29/memcached-more-cache-less-cash/>>, Jul. 29, 2009, pp. 8.

Meier, et al., "Improving SQL Server Performance", Retrieved at <<http://msdn.microsoft.com/en-us/library/ms998577.aspx>>, May 2004, pp. 32.

Pullen, Tom, "Analyzing SQL Server 2000 Data Caching", Retrieved at <<http://www.sql-server-performance.com/articles/per/sql2000_data_caching_p1.aspx>>, May 3, 2005, pp. 4.

Narayanan, et al., "Migrating Server Storage to SSDs: Analysis of Tradeoffs", Retrieved at <<http://research.microsoft.com/en-us/um/people/antr/MS/ssd.pdf>>, Proceedings of the 4th ACM European conference on Computer systems, Apr. 1-3, 2009, pp. 14.

Kang, et al., "Cache Strategies for Semantic", Retrieved at <<http://ieeexplore.ieee.org/stamp/stamp.jsp?tp=&arnumber=4027167&isnumber=4027154>>, Proceedings of the Seventh International Conference on Web-Age Information Management Workshops, Jun. 17-19, 2006, pp. 8.

Hutsell, Woody, "Faster SQL Server Database Access with the RamSan-210TM", Retrieved at <<http://www.texmemsys.com/files/f000128.pdf>>, Nov. 1, 2001, pp. 9.

Cornwell, et al., "Accelerating Database Performance With Flash Storage Technology", pp. 27, Oct. 12, 2009.

"Exadata Smart Flash Cache and the Sun Oracle Database Machine", Oct. 2009, pp. 1-10.

Lee, et al., "A Case for Flash Memory SSD in Enterprise DatabaseApplications", Proceedings of the 2008 ACM SIGMOD international conference on Management of data, Jun. 9-12, 2008, pp. 1075-1086.

Office Action dated May 22, 2013 cited in U.S. Appl. No. 13/305,670 (Copy Attached).

Swart et al., "This is your Database on Flash: Insights from Oracle Development", Retrieved at << http://www.oracle.com/technology/deploy/performance/pdf/OracleFlashl5.pdf>>, 2008, 35 pages. (The month of Publication is irrelevant since the year of Publication is clearly prior to the filing of the Application).

Office Action dated Jan. 3, 2014 cited in U.S. Appl. No. 13/305,670.

* cited by examiner

BUFFER POOL EXTENSION FOR DATABASE SERVER

BACKGROUND

With databases, good performance occurs when the working set of database pages are kept in main memory. Unfortunately, with the size of many large databases, it is not feasible to keep the working set in main memory. For a large database, this means that a majority of the data pages of the database reside on an I/O subsystem of sufficient capacity that is most often built using rotational media such as disk. Such subsystems are expensive, can take up a significant amount of space, and consume a significant amount of power. These subsystems often become a bottleneck for a database as the performance of rotational media is not advancing at the same rate as main memory and processors.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to a buffer pool for a database system. In aspects, secondary memory such as solid state storage is used to extend the buffer pool of a database system. Thresholds such as hot, warm, and cold for classifying pages based on access history of the pages may be determined via a sampling algorithm. When a database system needs to free space in a buffer pool in main memory, a page may be evicted to the buffer pool in secondary memory or other storage based on how the page is classified and conditions of the secondary memory or other storage.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment." Other definitions, explicit and implicit, may be included below.

Exemplary Operating Environment

Figure 1:
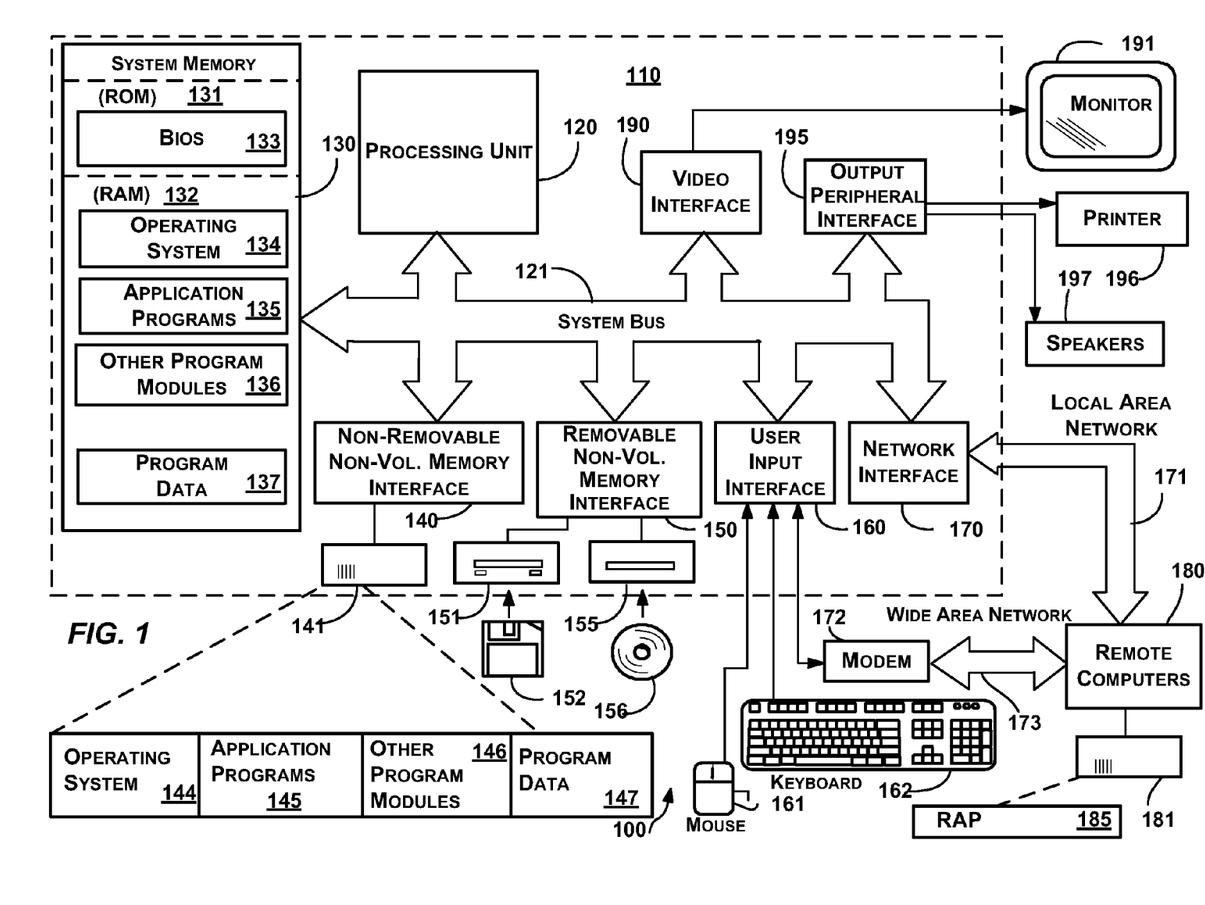
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Database Buffer Pool

Figure 2:
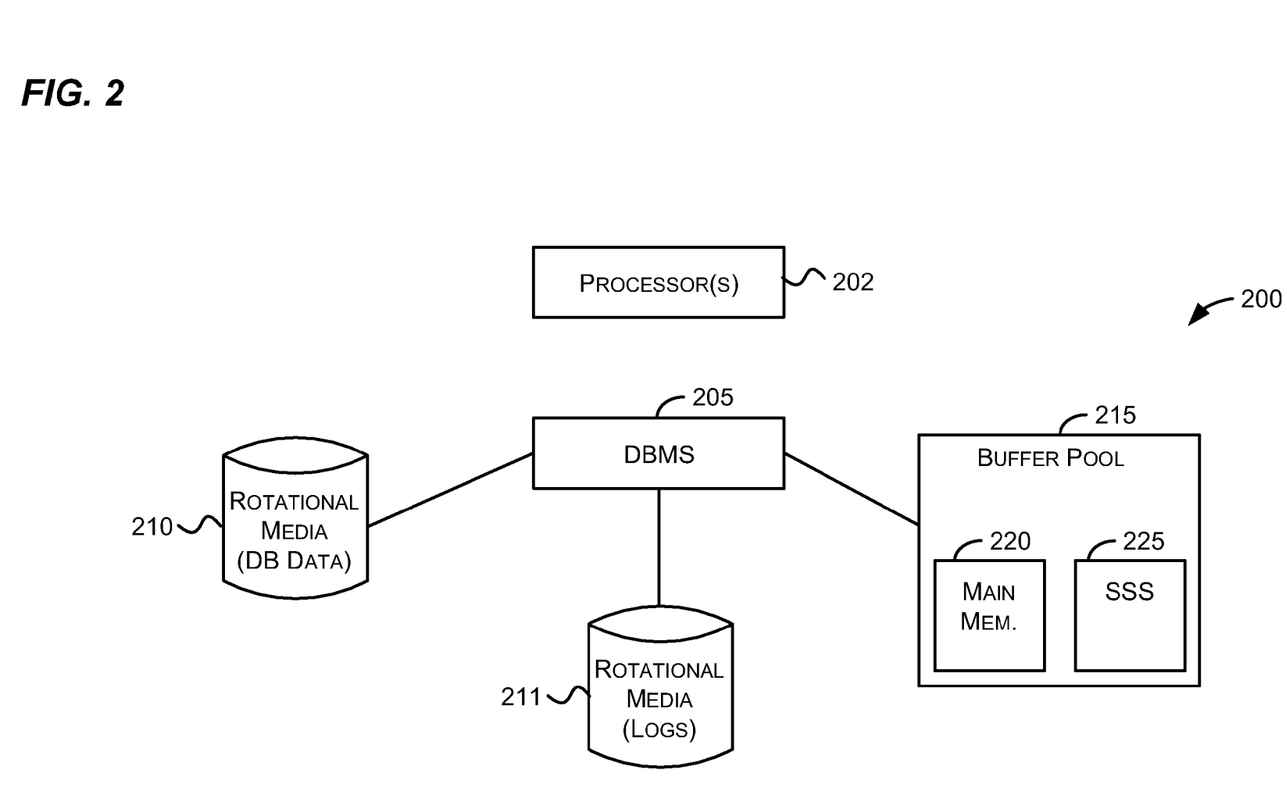
FIG. 2 is a block diagram that generally represents an exemplary system in which aspects of the subject matter described herein may be implemented.

As mentioned previously, I/O subsystems often become a bottleneck for a database. FIG. 2 is a block diagram that generally represents an exemplary system in which aspects of the subject matter described herein may be implemented. The system 200 may include one or more processors 202, database management system (DBMS) 205, rotational media 210-211, and may include other components. The DBMS 205 may manage pages in a buffer pool 215. The buffer pool 215 may be maintained in main memory 220 and solid state storage 225 (hereinafter sometimes referred to as SSS 225).

The system 200 may be implemented using one or more computers such as the computer 110 and may implement one or more databases. The processor(s) 202 of the system correspond to the processing unit 120 of FIG. 1 and may be included on the same computer or may be distributed across multiple computers. The processor(s) 202 execute instructions corresponding to the DBMS 205 to provide a database.

A database may comprise a relational database, object-oriented database, hierarchical database, network database, other type of database, some combination or extension of the above, and the like. Data stored in a database may be organized in tables, records, objects, other data structures, and the like. The data stored in a database may be stored in dedicated database files, dedicated hard drive partitions, HTML files, XML files, spreadsheets, flat files, document files, configuration files, other files, and the like.

Data in a database may be accessed via a DBMS such as the DBMS 205. The DBMS 205 may comprise one or more programs that control organization, storage, management, and retrieval of data of a database. The DBMS 205 may receive requests to access data in a database and may perform the operations needed to provide this access. Access as used herein may include reading data, writing data, deleting data, updating data, a combination including two or more of the above, and the like.

In describing aspects of the subject matter described herein, for simplicity, terminology associated with relational databases is sometimes used herein. Although relational database terminology is sometimes used herein, the teachings herein may also be applied to other types of databases including those that have been mentioned previously.

The DBMS 205 is operable to manage pages in a buffer pool in the main and secondary memory and to evict a page based on determining whether the page has accesses corresponding to at least three classifications. This is described in more detail below, but briefly, if accesses to the page are within a first range of percentiles the page may be considered to be in a first classification (e.g., "hot"). If the page has accesses within a second range of percentiles, the page may be considered to be in a second classification (e.g., "warm"). If a page has accesses within a third range of percentiles, the page may be considered to be in a third classification (e.g., "cold"). The classification of a page may be used to evict the page from main memory 220 and/or SSS 225.

For efficiency, performance, or other reasons, a database may locate data corresponding to tables, indexes, or other database data on one set of storage devices such as the rotational media 210 and data corresponding to logs on another set of storage devices such as the rotational media 211. For some databases, only one set of storage devices may be used to store tables and logs.

The buffer pool 215 includes portions of one or more databases that are in faster memory (relative to the rotational media 210-211). The portions of the one or more database are sometimes referred to as pages. Some of the memory (e.g., the main memory 220) of the buffer pool 215 may be volatile. That is, when power is cut off from the memory, the memory may lose any data stored thereon. The main memory 220 may be implemented as RAM, cache, processor memory, or other volatile high-speed memory. Other memory (e.g., the SSS 225) of the buffer pool 215 may be nonvolatile. That is, when power is cut off from the nonvolatile memory, the memory may persist any data stored thereon.

The amount of SSS (or other memory) assigned to the buffer pool 215 may be dynamically changed. That is, the bytes of SSS (or other memory) assigned to the buffer pool 215 may be increased, decreased, or set to zero automatically, semi-automatically, or manually before, during, or after execution of the DBMS 205.

The DBMS 205 may maintain metadata regarding the pages of the database that are stored in the buffer pool 215. For each page, this metadata may include, for example, two timestamps for storing the most recent one or two times that data on a page was accessed, a dirty flag to indicate whether the page has been modified, a flag that indicates whether a copy of the page is stored in the SSS 225, a counter to indicate a number of times that the page has been accessed, a weighted value that indicates frequency of access to the page with more weighting for more recent access, other information about the page, and the like. This metadata may be stored in the buffer pool 215 (e.g., as pages) or at some other location.

In operation, when the DBMS 205 receives a request to access data, the DBMS 205 may first determine whether the data is in the buffer pool 215. If the data is not in the buffer pool 215, the DBMS may determine whether there is space in the main memory 220 to read the data from the rotational media 210 into the main memory 220. If there is not space in the main memory 220, the DBMS determines a page that may be evicted from the main memory 220 to make space to read the page from the rotational media 210.

Although the steps above have been described in somewhat of a sequential manner, in other implementations, they may occur in a different order or in parallel. For example, in one embodiment, the DBMS 205 may attempt to maintain a certain portion of free space in the main memory 220. To do this, periodically or when the DBMS 205 determines that the free space in the main memory 220 is diminishing below a threshold, the DBMS 205 may scan the main memory 220 to determine what pages to evict from the main memory 220 to free up space. In this manner, the DBMS 205 may be able to reserve some space in the main memory 220 to use for use in reading pages from and writing pages to the rotational media 210.

In one embodiment, when there is memory pressure (e.g., the free space in the buffer pool goes below a pre-defined, calculated, selected, or other threshold, a process requests more memory, or some other memory pressure condition is met), the DBMS 205 may execute a scan algorithm. The scan algorithm may determine threshold values that may be used classify the pages into different categories. For example, in one embodiment, the scan algorithm may determine thresholds classify the pages into hot, warm, and cold categories based on metadata maintained about the pages.

In one embodiment, the scan algorithm may determine the thresholds by sampling metadata of a selected number of random pages. From the sampling, at least two thresholds may be determined. The thresholds may correspond to percentiles regarding access frequency to the pages. Pages having access characteristics below the lowest of the two thresholds may be considered cold. Pages having access characteristics between the lowest and the upper threshold may be considered warm. Pages having access characteristics above the upper threshold may be considered hot.

The terms "hot," "warm," and "cold" are not meant to impose limitations on aspects of the subject matter described herein. An idea of these terms is that the accesses to pages may fall within percentiles. Pages that fall within a higher range of percentiles may be said to be hot. Pages that fall between a lower and higher percentile may be said to be warm. Pages that are in a lower range of percentiles may be said to be cold. Other words, numbers, identifiers, data structures, or the like may be used instead of the words hot, warm, and cold without departing from the spirit or scope of aspects of the subject matter described herein. Furthermore, although only three designations are given, in other embodiments, there may be more than three designations.

One exemplary criterion that may be used to classify pages is frequency of accesses to the pages. Another exemplary criterion that may be used to classify pages is access history to the pages. For example, access history may include the last one or two times that a page has been accessed. If only the last access time is used to classify a page, this criterion is sometimes referred to as a last recently used (LRU) algorithm. If the next to the last access time is used to classify a page, this criterion is sometimes referred to as a (LRU-2) algorithm. The above examples are not intended to be all-inclusive or exhaustive. Indeed, based on the teachings herein, those skilled in the art may recognize many other criteria that may be used to classify pages.

In one embodiment, the sampling to determine the upper threshold may be performed on pages in the main memory 220 only while the sampling to determine the lower threshold may be performed on pages in the main memory 220 and the SSS 225.

After these thresholds have been determined, when the DBMS 205 needs to evict a page to make more space in main memory 220, the DBMS 205 may scan through the pages in the buffer pool in any of a variety of orders including, for example, sequential, round robin, random, last recently used, locality based, another order, and the like. If a page is above the cold threshold and below the warm threshold and there is space available in the SSS 225, the DBMS 205 may copy the page to the SSS 225 or indicate that the page is to be copied to the SSS 225 as soon as feasible (e.g., by putting a pointer to the page in a data structure such as a queue of pages that are to be copied from the main memory 220 to the SSS 225). After a page has been copied to the SSS 225, the memory freed in the main memory 220 may be used to store another page.

If there is not enough room in the SSS 225 for pages that are warm and cold, pages that are cold may be flushed or placed in a queue to flush to disk (if dirty) or marked as available (if clean). The pages to flush to disk may come from the main memory 220 as well as the SSS 225. In this case, in one embodiment, priority may be given to flushing cold pages from main memory 220 as compared to flushing cold pages from the SSS 225. For example, one or more data structure (e.g., one or more queues) may be maintained for flushing cold pages from the main memory 220 and the SSS 225. After the cold pages from main memory 220 have been flushed to disk, cold pages from the SSD 225 may be flushed to disk. In another embodiment, flushes of cold pages from the main memory 220 may be interleaved with flushes of cold pages from the SSS 225. If the hardware subsystem provides appropriate facilities, flushing cold pages from main memory 220 and flushing cold pages from the SSS 225 to disk may be performed in parallel.

Where appropriate hardware is available (e.g., direct memory access (DMA) hardware or the like), a flush of a page from the SSS 225 to disk may be performed without reading the page from the SSS 225 into main memory 220. Where such hardware is not available for the SSS 225, a flush of a page from the SSS 225 to disk may be performed by reading the page into the main memory 220 and then copying the page to disk from the main memory 220.

When the DBMS 205 needs to access a page that is in the SSS 225 but not in the main memory 220, the page may be copied from the SSS 225 to the main memory 220.

When buffer pages are to be written to the SSS 225, multiple writes may be combined into a single write, if possible. This may increase the I/O throughput as well as increase the lifetime expectancy of the SSS 225.

If an I/O threshold for the SSS 225 is reached, new I/Os may be directed to disk. An I/O threshold may be reached when the accesses to the SSS 225 approach the read/write bandwidth of the SSS 225 or some other pre-defined bandwidth. Whether the I/O threshold has been reached may be determined, for example, in terms of I/O response time, number of I/Os, or some other factor. For example, with a certain pattern or frequency of accesses, the I/Os to transfer data from the SSS 225 to the RAM 220 may exceed the bandwidth available to the SSS 225. In this case, subsequent I/Os may be sent to the rotational media 210 until the SSS 225 is available for more I/Os.

Figure 3:
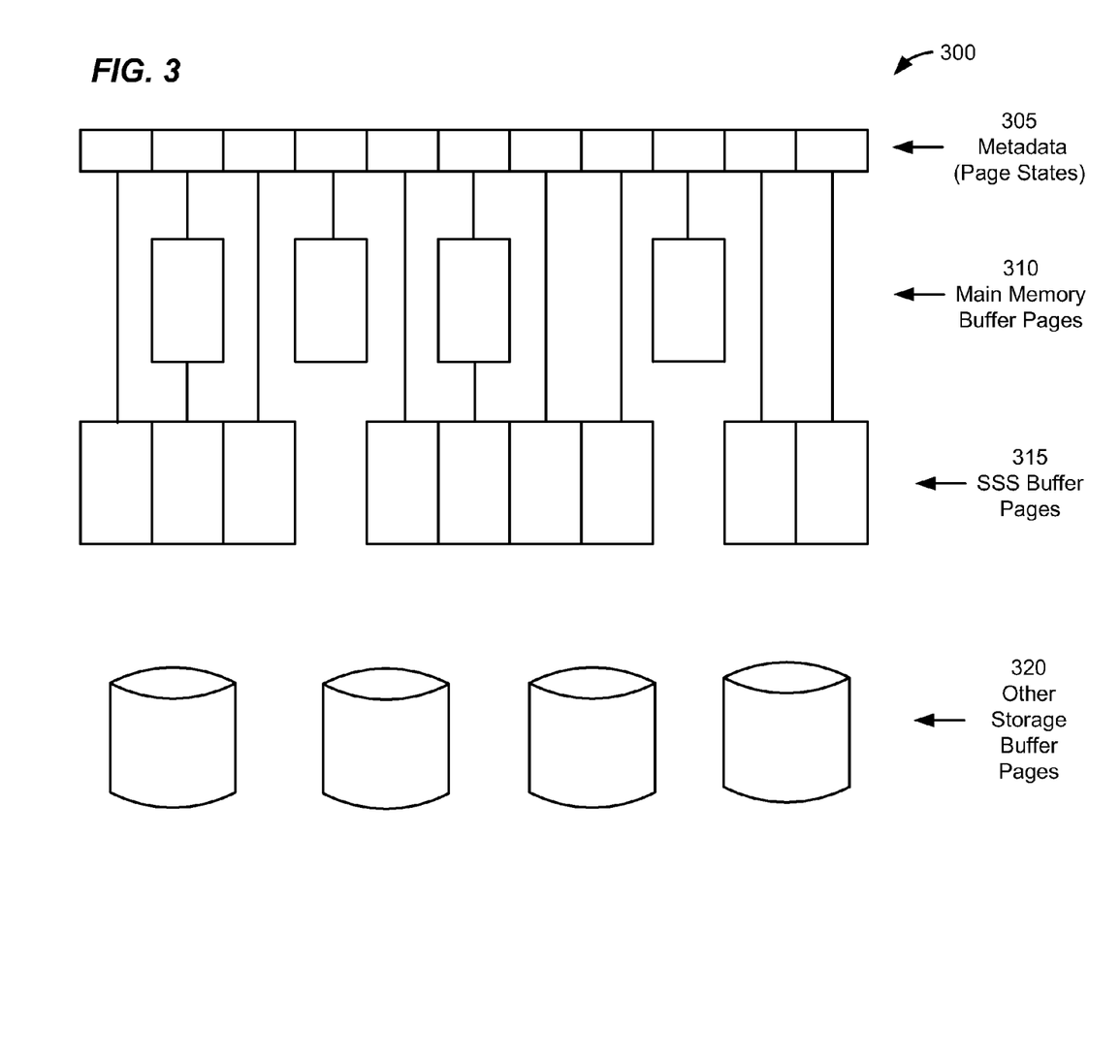
FIG. 3 is a block diagram that illustrates components of a system hosting a database in accordance with aspects of the subject matter described herein.

FIG. 3 is a block diagram that illustrates components of a system hosting a database in accordance with aspects of the subject matter described herein. The components 300 include metadata 305, main memory buffer pages 310, SSS buffer pages 315, and other storage 320. The metadata 305 includes data regarding pages as described previously. The metadata 305 may be stored in main memory, cache, or some other high speed memory. The metadata 305 may indicate that a page is stored in main memory and/or SSS.

The main memory buffer pages 310 may be stored in main memory such as RAM or other volatile memory. Such memory may be accessed without mechanical movement. In other words, such memory may provide access to data without physical movement of any components of the main. Such memory is often faster than mechanical types of storage.

The main memory buffer pages 310 may include hot pages, warm pages, and cold pages—depending on how much space is available. For example, the main memory buffer pages 310 may include some cold pages that have recently been retrieved from the other storage 320. Copies of some of the main memory buffer pages 310 may be stored in the SSS buffer pages 315. Some pages in the main memory buffer pages 310 may not have been copied to the SSS buffer pages 315. Furthermore, the SSS buffer pages 315 may include pages that are not in the main memory buffer pages 310.

The SSS buffer pages 315 may be stored in a secondary memory. To achieve performance gains, this secondary memory may perform better (e.g., faster response time, more bandwidth, or the like) than the storage 320. Some memory (such as solid state storage) may be accessed without mechanical movement and may be nonvolatile. Although this memory may perform better than the storage 320, the memory may be slower than the main memory.

The other storage 320 may comprise nonvolatile storage such as hard disks, tapes, other nonvolatile storage, and the like. This other storage 320 may include components (e.g., arms, platters or other media, and the like) that are operable to move (e.g., back and forth over the platter, rotate, or otherwise) to provide access to memory on the storage devices of the storage 320. In inexpensive implementations, the storage 320 may have less throughput than the main memory and SSS of the system 300. In some systems, however, through the use of many storage devices (e.g., disks) that work in combination, the throughput of the storage 320 may approach or exceed the throughput of the SSS, although the response time may be relatively large.

The metadata 305 stores information regarding the pages in the main memory buffer pages 310 and the SSS buffer pages 315. Such information may include metadata described previously in conjunction with FIG. 2.

The components illustrated in FIGS. 2-3 are exemplary and are not meant to be all-inclusive of components that may be needed or included. In other embodiments, the components and/or functions described in conjunction with FIG. 2-3 may be included in other components (shown or not shown) or placed in subcomponents without departing from the spirit or scope of aspects of the subject matter described herein. In some embodiments, the components and/or functions described in conjunction with FIG. 2-3 may be distributed across multiple devices.

Figure 4:
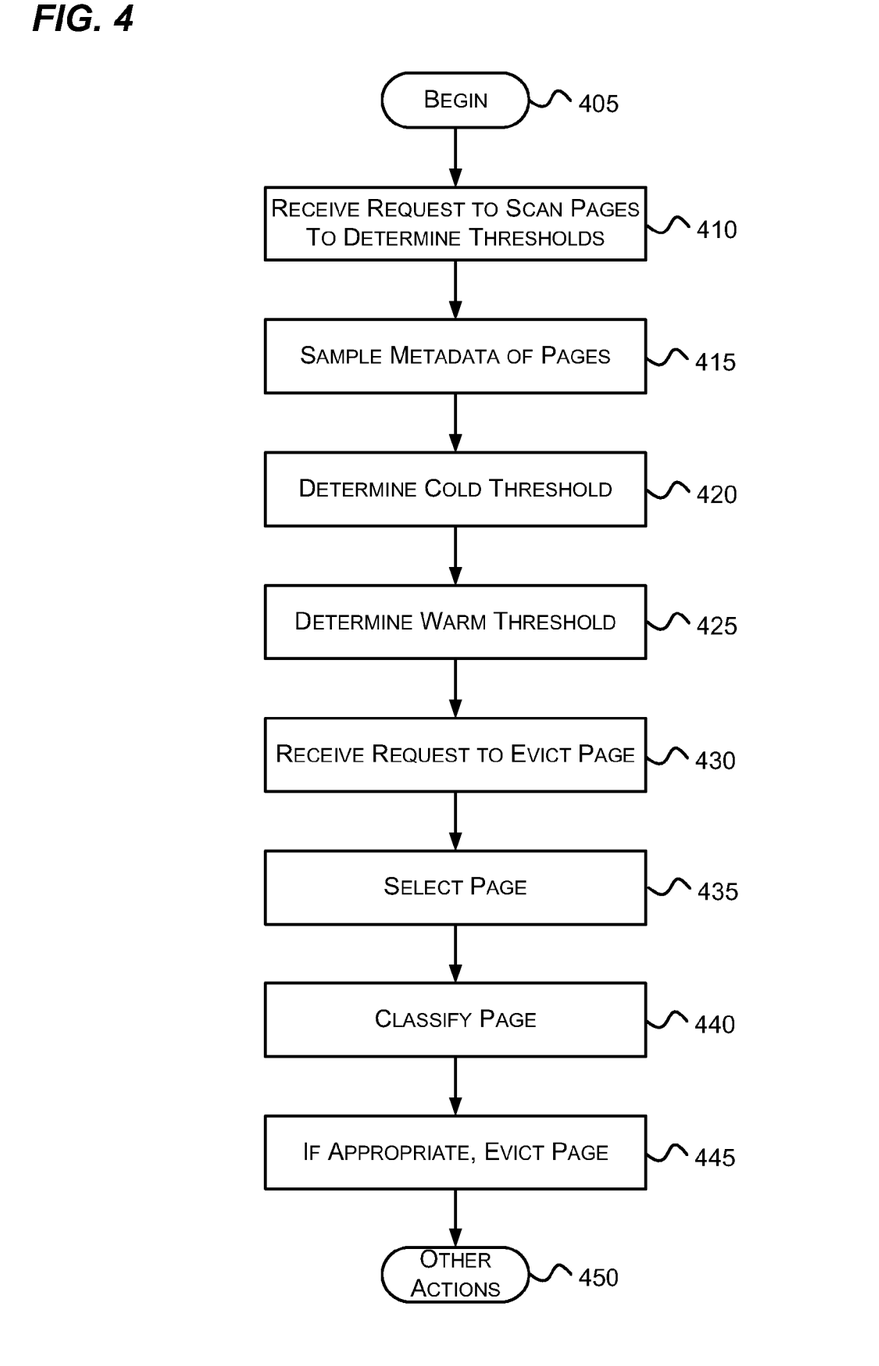
FIG. 4 is a flow diagram that generally represents some exemplary actions that may occur in scanning pages to determine thresholds and, where appropriate, evicting pages in accordance with aspects of the subject matter described herein.
Figure 5:
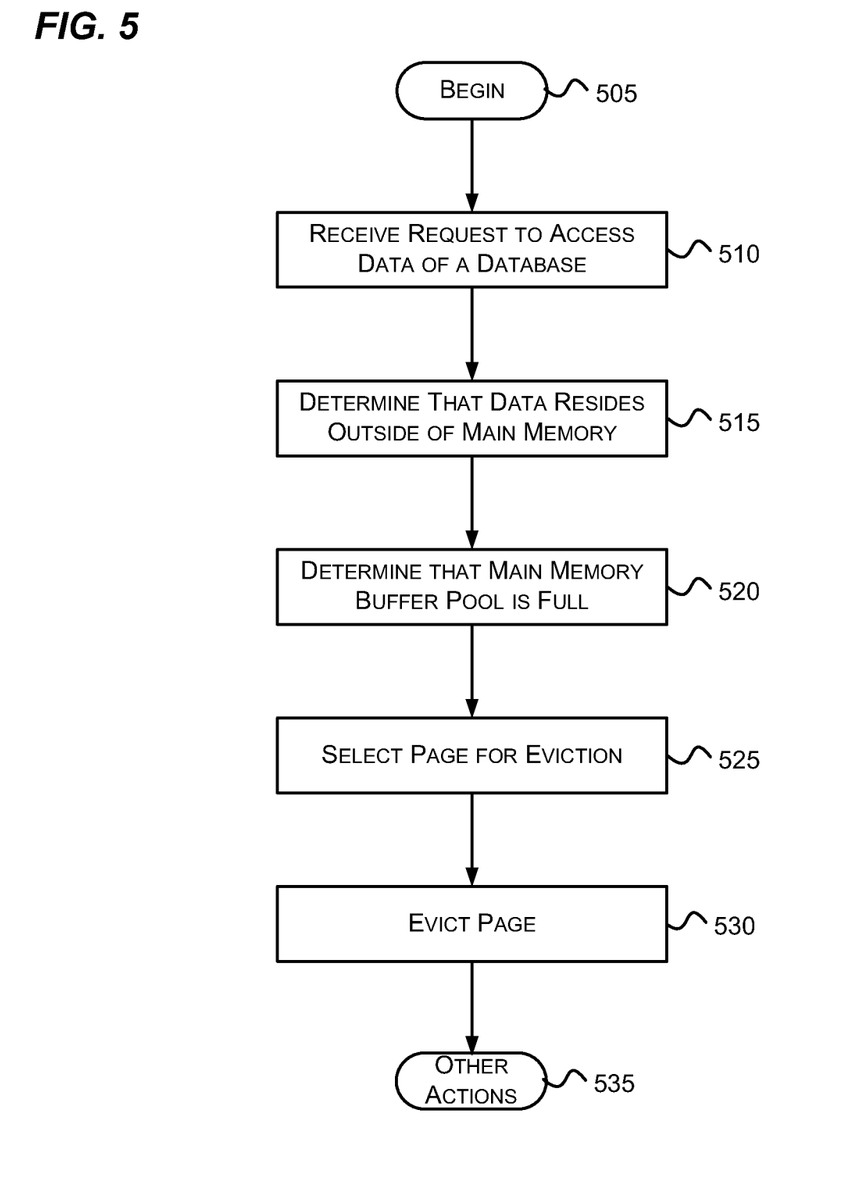
FIG. 5 is a flow diagram that generally represents some exemplary actions that may occur when an access request is received by a DBMS and a buffer pool is full in accordance with aspects of the subject matter described herein.

FIGS. 4-5 are flow diagrams that generally represent actions that may occur in accordance with aspects of the subject matter described herein. For simplicity of explanation, the methodology described in conjunction with FIGS. 4-5 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 4 is a flow diagram that generally represents some exemplary actions that may occur in scanning pages to determine thresholds and, where appropriate, evicting pages in accordance with aspects of the subject matter described herein. At block 405, the actions begin.

At block 410, a request to scan pages to determine thresholds is received. For example, referring to FIG. 4, in response to memory pressure, the DBMS 205 may send a request to scan pages to a buffer pool component.

At block 415, metadata of the pages is accessed. For example, referring to FIG. 3, the metadata 305 is accessed. Instead of accessing all of the metadata, this metadata of a number of randomly selected pages of the database buffer pool may be sampled. In one embodiment, sampling metadata of a page may include obtaining from the metadata of the pages one or two timestamps for each sampled page where the one or two timestamps correspond to a most recent time or times at which the sampled page was accessed. This metadata may be provided to a function (e.g., a classifying function) that generates values corresponding to accesses to the pages. The values generated by the function for metadata of the sampling may be used to select thresholds. For example, after obtaining the values from the function, thresholds may be selected that correspond to different pre-defined percentiles of the values. Ranges of percentiles (e.g., 0-5, 5-25, 25-100) may correspond to hot, warm, and cold.

At block 420, a cold threshold may be determined from the metadata. For example, a cold threshold may correspond to access frequencies of sampled pages with ranges of percentiles between 0 and 25. Once the cold threshold has been determined, a page may be determined to be cold if applying the function above to access data represented by the metadata of the page returns a value less than or equal to the cold threshold.

At block 425, a warm threshold may be determined from the metadata. For example, a warm threshold may correspond to access frequencies of sampled pages with ranges of percentiles between 25 and 75. Once the warm threshold has been determined, a page may be determined to be warm if applying the function above to access data represented by the metadata of the page returns a value greater than the cold threshold and less than or equal to the warm threshold.

At block 430, a request to evict a page is received. For example, referring to FIG. 2, an eviction component of the DBMS 205 may receive a request to evict a page from the buffer pool 215 to free space for one or more other pages.

At block 435, a page of the buffer pool 215 may be selected to consider for eviction. For example, referring to FIG. 3, one of the main memory buffer pages 310 may be selected to consider for eviction. Selection may be done using an algorithm, queue or other data structure, or the like used to cycle through the pages attempting to find a page appropriate for eviction.

At block 440, the page is classified. This may be done by applying the function mentioned above to the metadata of the page to obtain a value. This value may then be compared with the thresholds mentioned previously to determine whether the page is hot, warm, or cold.

At block 445, if appropriate, the page is evicted. For example, if the page is determined to be cold, the page may be evicted to disk. If the page is warm, the page may be copied to SSS unless a threshold for the SSS throughput is reached in which case the page may be evicted to disk. If the page is hot, the page may remain in main memory without being evicted.

At block 450, other actions, if any, may be performed.

FIG. 5 is a flow diagram that generally represents some exemplary actions that may occur when an access request is received by a DBMS and a buffer pool is full in accordance with aspects of the subject matter described herein. At block 505, the actions begin.

At block 510, a request to access data of the database is received. For example, referring to FIG. 2, the DBMS 205 may receive a request to access data in a database.

At block 515, the DBMS determines that the data resides outside of main memory. For example, referring to FIG. 2, the DBMS 205 may determine that the requested data resides in SSS 225 or rotational media 210.

At block 520, the DBMS determines that the buffer pool in main memory is full. For example, referring to FIG. 2, the DBMS 205 determines that the main memory 220 is full of pages and that a page needs to be evicted to make room for the data.

At block 525, a page is selected for eviction. Selecting the page for eviction may include using a function (e.g., the classifying function mentioned previously) that classifies the page according to one of at least three classifications (e.g., hot, warm, and cold) according to frequency of accesses to the page. For example, referring to FIG. 2, the DBMS 205 may determine a page in the main memory 220 for eviction.

At block 530, the page is evicted. For example, referring to FIG. 2, the DBMS 205 may evict the selected page to the SSS 225 or the rotational media 210. Evicting the page to the SSS 225 may comprise copying the page to the SSS 225. This keeps the page in the buffer pool 215, just not in the main memory 220 of the buffer pool. In this way, the SSS 225 may extend the buffer pool (rather than just acting as a separate cache for pages evicted from the main memory 220).

At block 535, other actions, if any, may be performed.

Although the discussion above has referred to using solid state storage to extend the buffer pool, in other embodiments, storage other than solid state storage may be used to extend the buffer pool. The other storage may be currently existing or yet to be developed. In accordance with aspects of the subject matter described herein, the other storage may have throughput, bandwidth, or some other characteristic that is better than rotational storage but worse than main memory.

As can be seen from the foregoing detailed description, aspects have been described related to a buffer pool for a data system. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer that includes first tier memory, second tier memory that is slower than the first tier memory, and third tier memory that is slower than the second tier memory, the method comprising:
   accessing metadata concerning a plurality of pages of a buffer pool, the buffer pool including one or more pages that are stored in the first tier memory, and one or more pages that are stored in the second tier memory;
   determining, from the metadata, a first threshold and a second threshold, wherein the first threshold and a second threshold are usable to classify the pages within one of at least three classifications, wherein:
   (i) a page is classified with a first classification if applying a function to access data represented by the metadata of the page returns a value less than the first threshold;
   (ii) the page is classified with a second classification if applying the function to access the data represented by the metadata of the page returns a value greater than the first threshold but less than the second threshold; or
   (iii) the page is classified with a third classification if applying the function to the access data of the metadata of the page returns a value greater than the second threshold; and based on the first and second thresholds:
   evicting a particular page from the second tier memory to the third tier memory, to free space for one or more other pages in the second tier memory, when the particular page is classified with the first classification;
   evicting the particular page from the first tier memory to the second tier memory, to free space for one or more other pages in the first tier memory, when the particular page is classified with the second classification; and
   leaving the particular page in the first tier when the particular page is classified with the third classification.

2. The method of claim 1, wherein accessing the metadata concerning the plurality of pages of the buffer pool comprises sampling metadata of a number of randomly selected pages of the buffer pool, the number being less than all the pages of the buffer pool.

3. The method of claim 2, wherein accessing the metadata concerning the plurality of the pages of the buffer pool comprises obtaining from the metadata one or two timestamps for each sampled page, the one or two timestamps corresponding to a most recent time or times at which the sampled page was accessed, the function operating on at least the one or two timestamps to generate a value indicative of whether the page is the first classification, the second classification, or the third classification.

4. The method of claim 1, wherein determining the first threshold comprises determining a value such that a pre-determined percentile of the randomly selected pages are cold.

5. The method of claim 1, wherein determining the second threshold comprises sampling metadata of a number of randomly selected pages of the database buffer pool, the randomly selected pages residing in the first tier memory.

6. The method of claim 5, wherein determining the second threshold comprises determining a value such that a pre-determined percentile of the randomly selected pages are warm.

7. The method of claim 1, wherein evicting the particular page from the first tier memory to the second tier memory comprises copying the particular page to the second tier memory only when (i) the second tier memory has available free space and (ii) a copy of the particular page is not already in the second tier memory.

8. The method of claim 1, further comprising changing an amount of the second tier memory used for the buffer pool.

9. The method of claim 1, further comprising determining whether an I/O threshold for the second tier memory has been reached, and if so, copying the particular page to a memory other than the first tier memory and the second tier memory.

10. The method of claim 1, wherein evicting the particular page from the first tier memory to the second tier memory comprises copying a plurality of pages from the first tier memory to the second tier memory in a single write operation.

11. The method of claim 1, wherein the first classification is applied to pages that are less frequently accessed, the third classification is applied to pages that are more frequently accessed, and the second classification is applied to pages that are accessed more frequently than pages classified with the first classification but less frequently than pages classified with the third classification.

12. The method of claim 1, wherein the first classification is a cold classification, the second classification is a warm classification, and the third classification is a hot classification.

13. The method of claim 1, wherein the first classification is applied to pages that have been least recently accessed, the third classification is applied to pages that have been most recently accessed, and the second classification is applied to pages that have been accessed more recently than pages classified with the first classification but less recently than pages classified with the third classification.

14. The method of claim 1, wherein determining the second threshold comprises analyzing metadata relative to only the one or more pages that are stored in the first tier memory, while determining the first threshold comprises analyzing metadata relative to both the one or more pages that are stored in the first tier memory and also the one or more pages that are stored in the second tier memory.

15. The method of claim 1, wherein the buffer pool is a database buffer pool.

16. The method of claim 1, wherein the third tier memory comprises one or more hard disks, the first tier memory comprises random access memory, and the second tier memory comprises solid state memory.

17. In a computing environment, a system, comprising:
   one or more processors;
   first tier memory, second tier memory that is slower than the first tier memory, and third tier memory that is slower than the second tier memory; and one or more computer-readable storage devices having stored thereon computer executable instructions, which when executed by the one or more processors perform actions, comprising:

accessing metadata concerning a plurality of pages of a buffer pool, the buffer pool including one or more pages that are stored in the first tier memory, and one or more pages that are stored in the second tier memory;

determining, from the metadata, a first threshold and a second threshold, wherein the first threshold and a second threshold are usable to classify the pages within one of at least three classifications, wherein:

(i) a page is classified with a first classification if applying a function to access data represented by the metadata of the page returns a value less than the first threshold;

(ii) the page is classified with a second classification if applying the function to access the data represented by the metadata of the page returns a value greater than the first threshold but less than the second threshold; or (iii) the page is classified with a third classification if applying the function to the access data of the metadata of the page returns a value greater than the second threshold; and based on the first and second thresholds:

evicting a particular page from the second tier memory to the third tier memory, to free space for one or more other pages in the second tier memory, when the particular page is classified with the first classification;

evicting the particular page from the first tier memory to the second tier memory, to free space for one or more other pages in the first tier memory, when the particular page is classified with the second classification; and leaving the particular page in the first tier when the particular page is classified with the third classification.

18. The system of claim 17, wherein the third tier memory comprises one or more hard disks, the first tier memory comprises random access memory, and the second tier memory comprises solid state memory.

19. A hardware storage device having stored thereon computer-executable instructions, which when executed perform actions, comprising:

receiving a request for data of a data set;

determining that the data resides in secondary storage other than main memory and that is slower than the main memory;

determining that a buffer pool in the main memory is full;

selecting a candidate page for eviction from the buffer pool in main memory based on a function that classifies the candidate page according to one of at least three classifications according to accesses to the candidate page, wherein:

(i) the candidate page is classified with a first classification if applying the function returns a value less than a first threshold;

(ii) the candidate page is classified with a second classification if applying the function returns a value greater than the first threshold but less than a second threshold; or (iii) the candidate page is classified with a third classification if applying the function returns a value greater than the second threshold; and determining whether and how to evict the candidate page based on the one of at least three classifications, including:

when the candidate page is classified with the first classification, determining that the candidate page should be evicted from the secondary storage to third storage that is slower than the secondary storage, to free space for one or more other pages in the secondary storage;

when the candidate page is classified with the second classification, determining that the candidate page should be evicted from the main memory to the secondary storage, to free space for one or more other pages in the main memory; and when the candidate page is classified with the third of the classifications, determining that the candidate page should be left in the main memory.

20. The hardware storage device of claim 19, wherein the third storage comprises one or more hard disks, the main memory comprises random access memory, and the secondary storage comprises solid state memory.

* * * * *